B. CAHN.
COMBINED SHOVEL AND AUTOMOBILE TRACTION.
APPLICATION FILED NOV. 29, 1912.

1,061,980.

Patented May 20, 1913.

Witnesses:
Floyd Chaffee,
Elmer E. Rodabaugh.

Inventor:
Bernard Cahn
By A. B. Bowman
Atty.

UNITED STATES PATENT OFFICE.

BERNARD CAHN, OF SAN DIEGO, CALIFORNIA.

COMBINED SHOVEL AND AUTOMOBILE TRACTION.

1,061,980.     Specification of Letters Patent.     Patented May 20, 1913.

Application filed November 29, 1912. Serial No. 733,993.

*To all whom it may concern:*

Be it known that I, BERNARD CAHN, a subject of the Russian Empire, and resident of San Diego, in the county of San Diego and State of California, have invented a certain new and useful Combined Shovel and Automobile Traction, of which the following is a specification.

This invention relates to automobile accessories and more particularly to devices for use when an automobile is stuck in mud or sand by reason of insufficient traction and some of the objects of my invention are; First, to provide a simple, economical and easily constructed device of this class, second, to provide such a device that is collapsible so that it may be packed into a small space and easily carried, third, to provide a shovel composed of several of the parts of my traction device which is adapted to facilitate the removal of earth from in front or back of the wheels of an automobile.

With these and other objects in view as will appear my invention consists of certain novel features as will be hereinafter described in detail and particularly set forth in the appended claims, reference being had to the accompanying drawing and to the characters of reference thereon which form a part of this specification, in which:—

Figures 1, 2, 3:
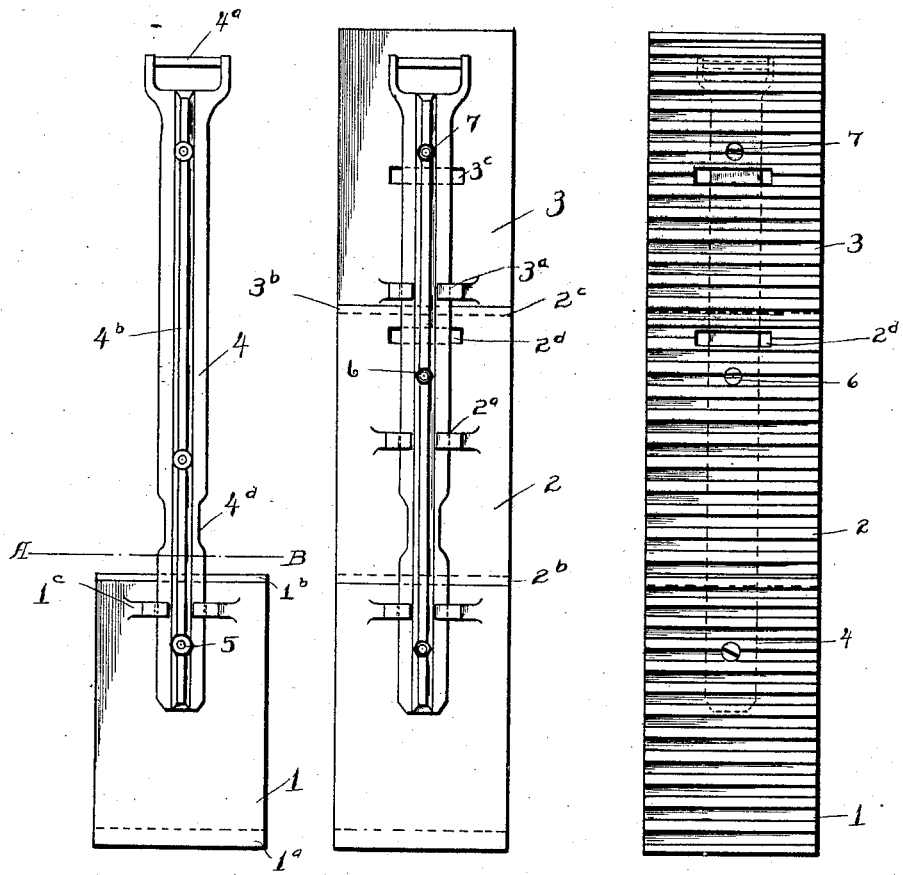
Figure 4:
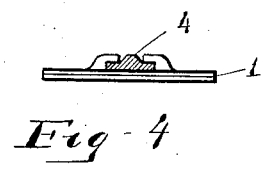
Figure 5:
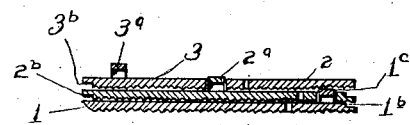

Figure 1, is an elevational view of the shovel arrangement made from several of the parts of my traction device, Fig. 2, is a back elevational view of the device complete as used for traction purposes, Fig. 3, is a front elevational view thereof; Fig. 4, is a transverse sectional view through A—B of Fig. 1, and Fig. 5, is a central sectional view of the three traction pieces packed together into a compact form.

Similar characters of reference refer to similar parts throughout the several views.

Shovel piece 1, central traction piece 2, end traction piece 3, and the handle piece 4, constitute the principal parts of my device.

The shovel piece 1, is provided on its one end with a beveled edge $1^a$, and is rabbeted on one side at its opposite end as shown at $1^b$. It is provided on its back side with a double lug $1^c$, adapted to fit over the handle piece 4. The central piece 2, is provided centrally with a double lug $2^a$, similar to the lug $1^c$ on the piece 1, adapted for the same purpose and it is rabbeted at its one end on the back side $2^b$ to fit the extended end portion of the piece 1, thus forming a rabbeted joint between the pieces 1 and 2. It is also provided on its opposite end on the front side with a rabbeted portion $2^c$. It is provided near one end with a slot $2^d$ adapted to receive the double lug $1^a$ when the traction pieces are packed together as shown in Fig. 5. The piece 3 is also provided with a double lug $3^a$, similar to the lugs on the other traction pieces and it is rabbeted on its one end at $3^b$ adapted to fit and form a rabbeted joint with the end $2^c$ of piece 2. It is also provided with a central slot $3^c$ adapted to receive the lug $2^a$ on the central piece 2 when the traction pieces are packed together as shown in Fig. 5.

The handle piece 4, consists of a handle $4^a$ and it is provided on its back surface with a beveled reinforcing rib, $4^b$. It is provided with notches $4^d$ to furnish a better hand hold when using the shovel portion of the device. In constructing the shovel the handle piece 4 is rigidly attached to the piece 1 by means of a bolt 5,—the handle piece 4 fitting under the double lug $1^c$. When it is desired to form a complete traction piece the pieces 2 and 3 are joined with the piece 1,—the rabbeted joints fitting into each other as shown best in Figs. 2 and 3. The handle piece 4 is then inserted beneath the lugs $1^a$, $2^a$ and $3^a$ and bolted to the pieces by means of the bolts 5, 6 and 7,—preferably one in each piece. Each of the traction pieces, 1, 2 and 3 are provided on their front sides with a plurality of notches thereby forming a rough surface to facilitate the traction on the combined pieces.

Though I have shown and described a particular construction and arrangement of parts I do not wish to be limited to this particular construction and arrangement, but desire to include in the purview of my invention, the construction and arrangement substantially as set forth in the appended claims.

It is obvious that with this construction there is provided a shovel which may be quickly assembled and which is adapted to facilitate the removal of earth from in front or back of vehicle wheels; that when all of the pieces are assembled as shown in Figs. 2 and 3, there is provided a substantial device to be placed under the wheel of a vehicle to provide additional traction for said wheel; that the device is simple, easily constructed, easily assembled, easily collapsed and packed so as to occupy a small space.

Having thus described my invention, what I claim as new and desire to secure by Letters Patent is:—

1. A device of the class described comprising a plurality of traction pieces connected together end to end and a bar detachably mounted longitudinally in the middle thereof rigidly connecting and reinforcing said pieces.

2. A device of the class described comprising a plurality of traction pieces joined end to end by rabbeted joints and a bar detachably mounted longitudinally in the middle thereof rigidly connecting and reinforcing said pieces.

3. A device of the class described comprising a plurality of notched surface traction pieces joined together by means of rabbeted joints and a bar provided with a handle piece adapted to engage said lugs, and rigidly attached to said traction pieces for connecting and reinforcing them.

4. A device of the class described comprising a shovel consisting of a rectangularly shaped shovel piece, a handle piece adapted to be readily and rigidly connected to said shovel piece and a plurality of rectangularly shaped pieces adapted to engage said handle piece, which, when rigidly connected together by said handle piece form a single traction piece.

5. A device of the class described comprising a plurality of rectangularly shaped pieces joined together at their ends and a bar provided with a handle on one end rigidly connecting together and reinforcing said rectangularly shaped pieces.

6. A device of the class described comprising a plurality of rectangularly shaped pieces, each provided with a notched surface on its one side and a lug on its opposite side, joined together end to end, and a bar adapted to engage with said lugs on the backs of said rectangularly shaped pieces rigidly connected to said pieces by means of bolts.

7. A device of the class described comprising a plurality of rectangularly shaped pieces joined together end to end and rigidly connected together and reinforced by means of a bar adapted to engage with lugs on the backs of said rectangularly shaped pieces, said rectangularly shaped pieces being provided with a plurality of notches and a portion of said rectangularly shaped pieces provided with slots adapted to engage with the lugs on their adjacent rectangularly shaped pieces when packed together and not in use.

In testimony whereof, I have hereunto subscribed my name in the presence of two subscribing witnesses.

BERNARD CAHN.

Witnesses:
ABRAM B. BOWMAN,
ELMER E. RODABAUGH.

---

Copies of this patent may be obtained for five cents each, by addressing the "Commissioner of Patents, Washington, D. C."